Sept. 27, 1966   A. S. MacRAE ETAL   3,275,170
HYDRAULIC LOADING DEVICES

Filed Oct. 5, 1964   3 Sheets-Sheet 1

INVENTORS
ALLISTER S. MacRAE
JOHN C. MARTIN
BY Featherstonhaugh &Co.
ATTORNEYS

INVENTORS
ALLISTER S. MacRAE
JOHN C. MARTIN
BY- Fetherstonhaugh & Co.
ATTORNEYS

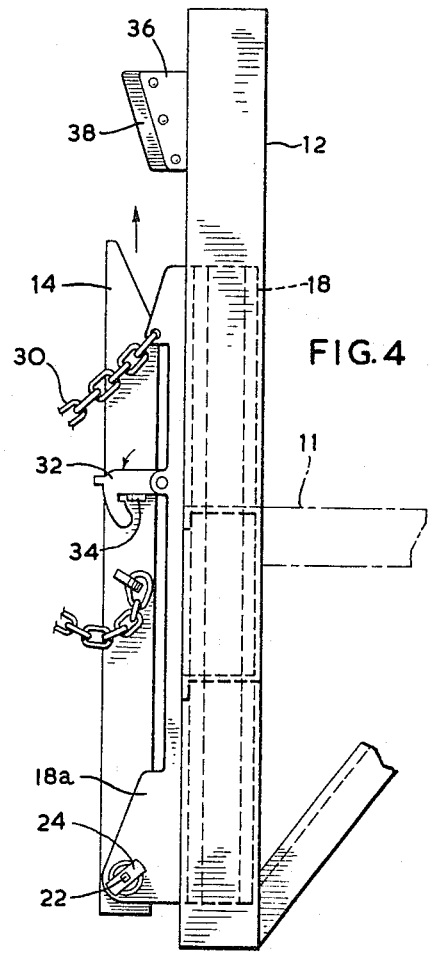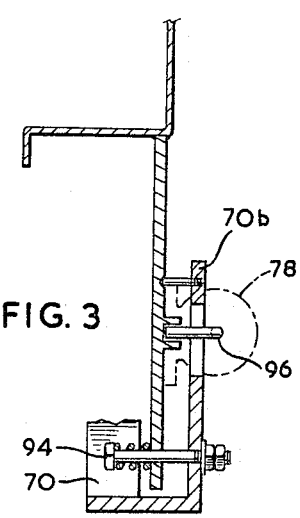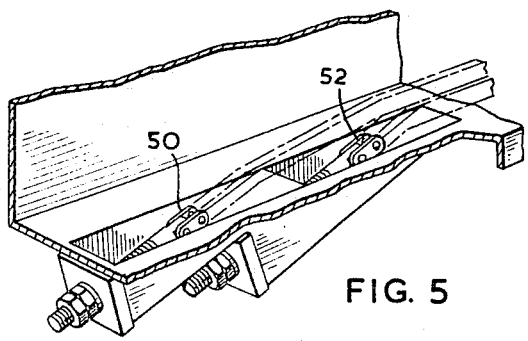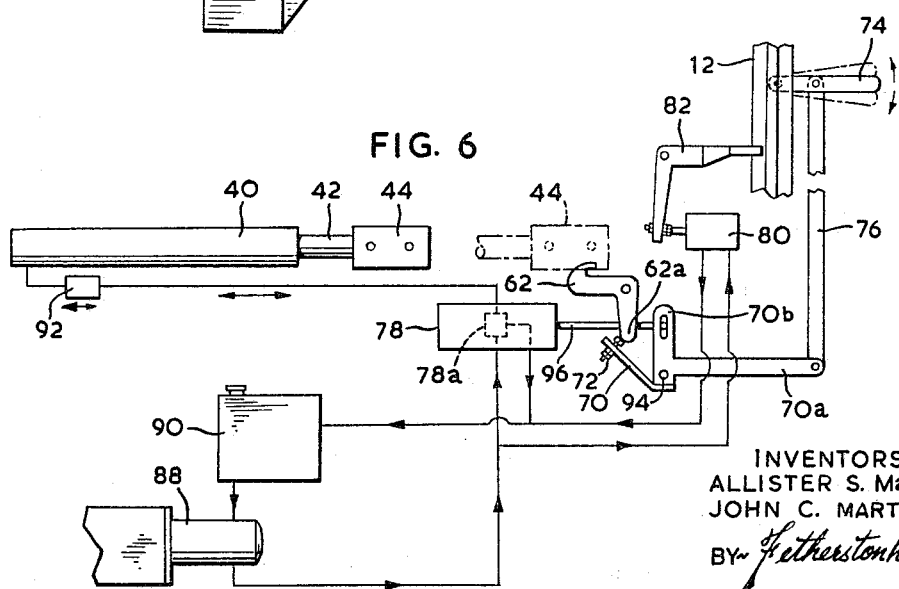

United States Patent Office 3,275,170
Patented Sept. 27, 1966

3,275,170
HYDRAULIC LOADING DEVICES
Allister S. MacRae, Leaside, Ontario, and John C. Martin, Toronto, Ontario, Canada, assignors to Diesel Equipment Limited, Toronto, Ontario, Canada
Filed Oct. 5, 1964, Ser. No. 401,539
18 Claims. (Cl. 214—75)

This invention relates to loading devices for vehicles and is particularly concerned with a device of this type which can be used to particular advantage as a powered tailgate.

As indicated above, the device in accord with this invention can be used to best advantage for attachment to vehicles for loading the vehicles and it essentially consists of a hydraulic operated platform for raising loads from ground level to the floor of the truck body. The device may be used as a side loader or as a combination tailgate and loader for attachment to the rear of a vehicle. The device is not restricted to use on vehicles and can be used as a loader fixed in position, for example, at the door of a warehouse.

Since one of the principal uses of the device is as a powered tailgate, the following description refers to this form of the invention for purposes of illustration.

The majority of previous powered tailgates which have been hydraulically operated consist of platforms which go through a partially pivotal movement in being raised from ground level to the level of the truck body. This arrangement has numerous disadvantages. Firstly, the tailgate is not generally parallel to the ground for all positions of the gate. Secondly, it is not possible to gain entrance to the truck body without fully lowering the tailgate. Thirdly, the hydraulic ram used for raising the gate has normally been positioned beneath the truck body in such a manner as to interfere with access to spare tires which are normally stored at the lower rear of the truck body.

The powered tailgate in accord with this invention is generally superior to those known heretofore, particularly with respect to the disadvantages noted above. First of all, it is a primary advantage of the tailgate in accord with this invention that the gate may be lowered as to provide access to the truck body without swinging the tailgate away from the truck body. In other words, the gate can be lowered while it is maintained in a vertical plane. This means, for example, that a truck may be backed up closely to a warehouse platform so that heavy loads might be transferred directly from the warehouse platform to the truck without moving the heavy loads over the tailgate. It can be appreciated that with the majority of the known tailgate arrangements wherein the truck body could not be exposed without swinging the tailgate downward, it has been necessary to first lower the tailgate to the horizontal position and then raise it to the level of the truck body floor before backing the truck against the warehouse platform. Thus, under these conditions the loads moving from the warehouse to the truck have always had to be passed over the tailgate itself. This has subjected the known tailgates to much greater loading over a fixed period than really necessary. Another advantage of the tailgate in accord with this invention is that the gate platform is always positioned parallel to the ground at all levels of the gate. Numerous other refinements are incorporated in the device, including ease of operation and maintenance, adjustments for both raising and lowering speeds, safety devices for effecting positive lock of the gate, and torsion bar assist for closing the gate.

The above features of the invention will be more thoroughly understood from the following description of the preferred embodiment thereof read in conjunction with the accompanying drawings.

In the drawings,

FIGURE 3 is a side elevational view taken along the line 3—3 of FIGURE 2;

FIGURE 4 is a side elevational view taken along the line 4—4 of FIGURE 1;

FIGURE 5 is a detailed view of the arrangement for anchoring the chains illustrated in full in FIGURE 1; and FIGURE 6 is a schematic view of a hydraulic circuit operating the device.

Figure 1:
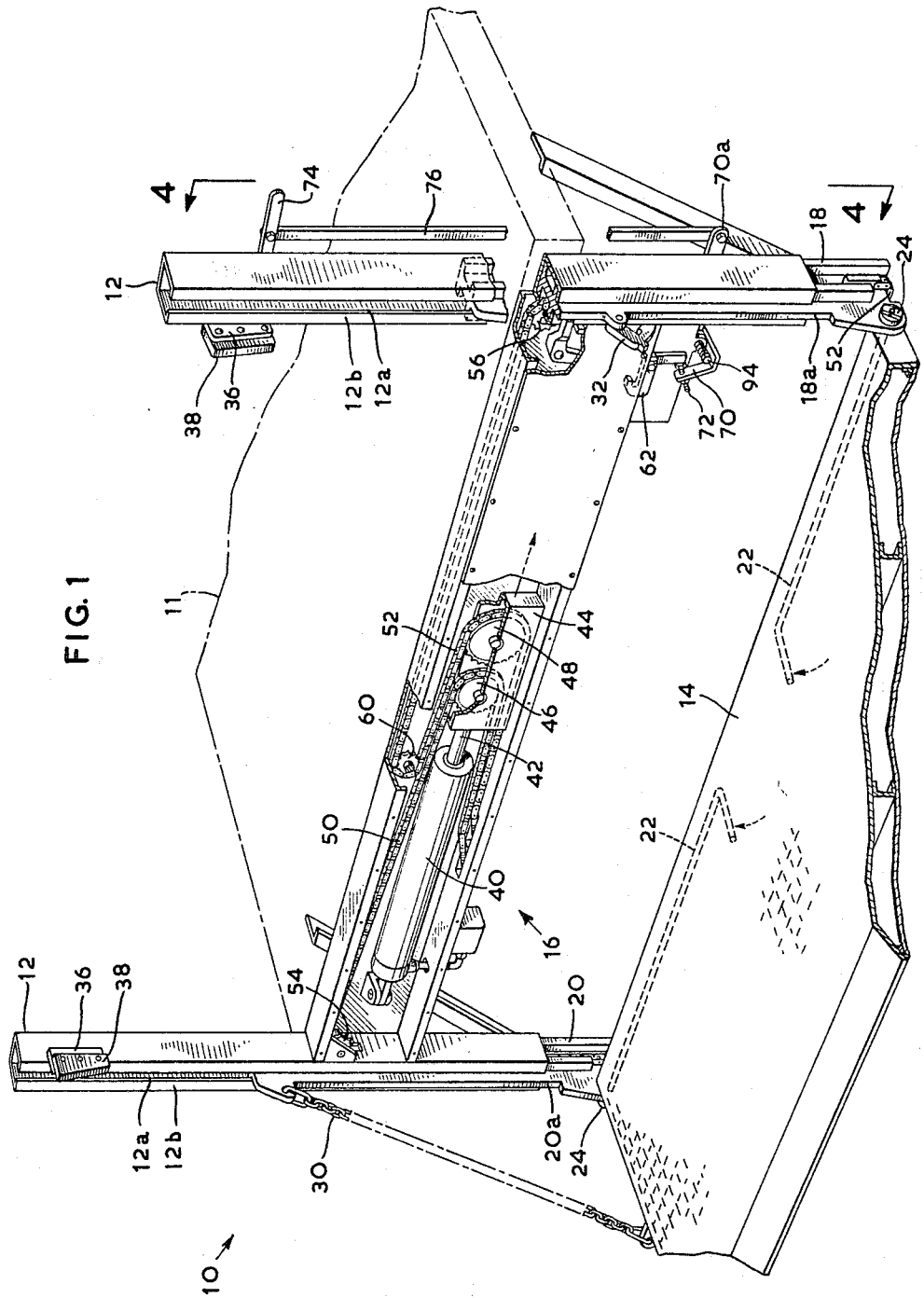
FIGURE 1 is a perspective view, partly broken away, of a hydraulic loading device in accord with the invention in the form of a powered tailgate attached to the rear of a vehicle.

Referring to FIGURE 1, the powered tailgate 10 is shown as being attached to a truck body platform 11 with the latter being shown in dot and dash lines. Here it is to be understood that the device 10 may be attached to the side of a vehicle or to a warehouse platform or any other platform to which heavy loads must be raised.

The device essentially consists of two vertically spaced side posts 12, a pivotal platform 14, and a hydraulic ram unit 16. As is explained hereinafter in detail, the unit 16 is capable of raising the platform 14 with the platform in either the position shown in FIGURE 1, i.e. parallel to the ground, or in a vertical position. With the platform in the former position, the platform 14 acts as a hoist and when it is in the vertical position, it acts merely as a door for closing the rear of the vehicle, which door may be simply lowered straight down as to provide access to the truck body.

As can be seen in FIGURE 1, posts 12 are hollow and are provided with a full length slot 12a extending over the full length of their front faces 12b. Contained within posts 12 are a pair of slides 18 and 20 which essentially consist of T-shaped members having outwardly projecting flanges 18a and 20a which are engaged in the slots 12a.

Figure 2:
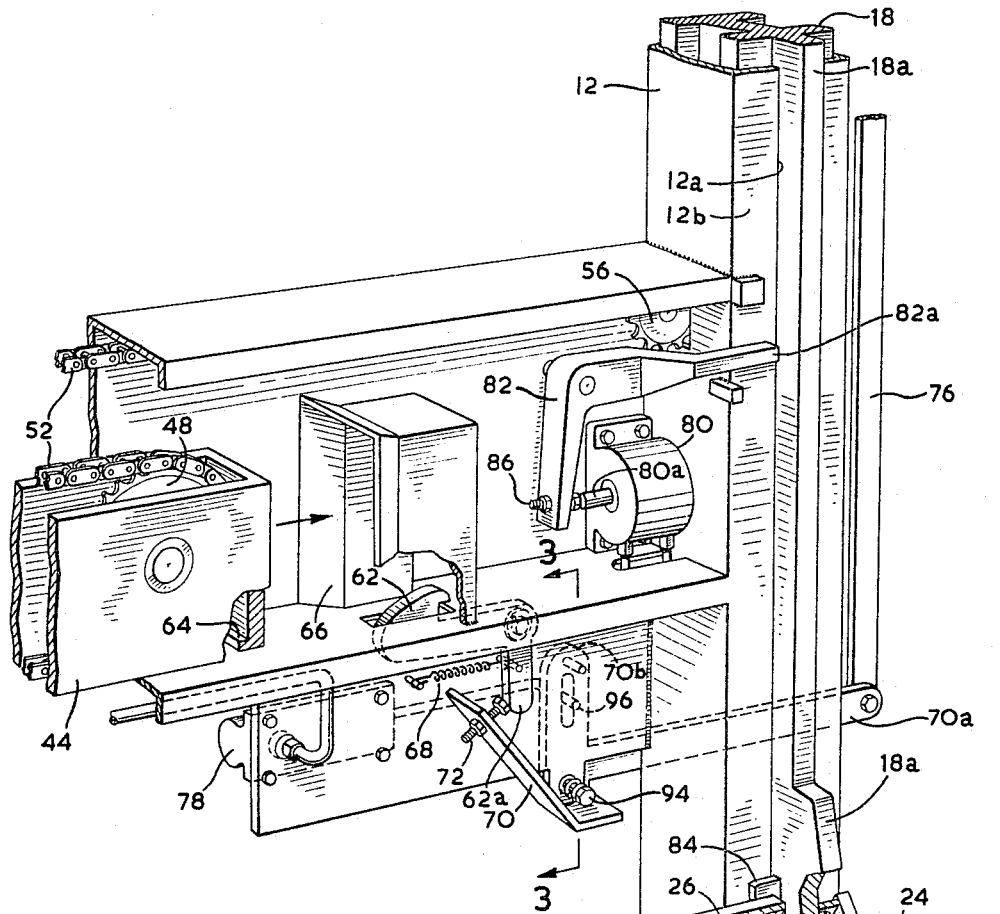
FIGURE 2 is a perspective view similar to FIGURE 1 but on a somewhat larger scale and showing certain portions of the device in greater detail.

Platform 14 is pivotally attached to the lower ends of slides 18 and 20. This attachment is best seen in FIGURE 2. The platform is a reinforced shallow box-like unit and contains a pair of torsion bars 22, the outer ends of which are rigidly attached to brackets 24 with the latter being fixed by welding or the like to the lower ends of slides 18 and 20. More precisely stated, these brackets 24 are fixed to an extended portion of the flanges 18a and 20a. The torsion bars pass through bearings 26 which are fixed to the platform but which themselves are capable of freely rotating relative to the flanges 18a and 20a. It can be seen, therefore, that the actual pivotal connection between the platform and the lower ends of the members 18 and 20 is effected by these bearings 26 while the torsion bars 22 serve as counter-balances for assisting the operator in pivotally raising the platform.

The torsion bars preferably consist of steel of good quality and their size is dependent upon the size of the platform concerned. The bars are preferably pre-stressed to such a degree that only 15 to 20 lbs. lift must be exerted by the operator on the under-side of the platform to raise same. This pre-stressing is accomplished in each case by determining the proper angle for brackets 24 before the brackets are welded to the extended portion of the flanges 18a. In other words, before the brackets are fixed in place, they are turned until it is found that the platform can be raised by 15 to 20 lbs. pressure and the brackets are then welded in place.

While the counter-balancing effect of the torsion bars normally maintains the platform 14 at a position roughly parallel to the ground, the resistance offered by the torsion bars is not relied upon to carry the loads imposed on the platform. Thus, there is provided a pair of chains 30, which arrangement is a well-known expedient. Platform 14 is retained in its vertical position by means of a catch 32 which engages a latch 34 carried by the platform. To ensure continuing engagement of the latch, there is provided a pair of wedges 36 carried by the posts 12 and so shaped that the outer edge of the platform is wedged against these wedges when the door is raised to its top position so as to outwardly urge the upper edge of the platform, thereby solidly locking the catch 32 on member 34. Preferably wedges 36 carry resilient rubber bumpers 38.

Referring again to FIGURE 1, the hydraulic ram unit 16 essentially consists of an enclosed box which is fixed to the outer rear edge of the truck body platform 11. Contained within the box there is a hydraulic ram 40 having the usual piston and cylinder and carrying at the outer free end of the piston shaft 42 a sprocket carriage 44. Maintained within the carriage for free rotation, there is a pair of chain sprockets 46 and 48 over which are run a pair of chains 50 and 52, with one end of the chains being fixed to the lower wall of the ram box as shown in FIGURE 5. The other ends of the chains are fixed to the lower ends of slides 18 and 20. Several idler sprockets 54, 56 and 60 are used to guide the chains. In FIGURE 1, the platform 14 is shown as positioned considerably below the truck body platform 11 and the ram is appropriately illustrated as only being partially extended. It can be seen that as the ram is more fully extended, the platform 14 will be raised.

To positively lock the platform in its fully raised position, there is provided a latch 62 which is so designed to engage the forward under-side lip 64 of the sprocket carriage 44. This mechanism can best be seen in FIGURE 2. As the outer free end of the piston of the ram is possibly capable of some movement transverse to the axis of the ram, a guide 66 is positioned over the latch 62 as to ensure that the sprocket carriage 44 will be engaged by the latch. Latch 62 essentially consists of a pivotal L-shaped member and is biased by the spring 68 to the locking position. To free the latch from its engagement with the sprocket carriage 44, there is provided a device for overcoming the bias of spring 68 which consists of a bracket 70 which carries an adjustable detent 72 which bears against the portion 62a of the latch when bracket 70 is moved into its uppermost position through operation of the hand lever 74. The hand lever is pivotally connected to the extended portion 70a of bracket 70 by the connecting rod 76. Operation of the hand lever also has one further effect, viz. operation of the main control valve 78 for the hydraulic system as is explained hereinafter.

As raising of the platform 14 is effected through hydraulic pressure to the ram 40, it is desirable that this pressure be interrupted when the platform has been raised to its uppermost position. This is accomplished through a knock-off valve 80 which has the effect of by-passing fluid pressure past the main control valve. The knock-off valve is operated by the pivotal L-shaped lever 82 which includes a first arm 82a which is raised by a stop member 84 carried at the lower end of flange 18a. The other end of lever 82 carries an adjustable detent 86 which bears against a spindle 80a of the knock-off lever so that as the end 82a is raised, the spindle 80a is pushed inwardly as to set valve 82 into operation. Spindle 80a is normally biased outwardly as to close off this valve at all other times.

The hydraulic circuit is shown in FIGURE 6. The source of fluid pressure may be a pump 88 driven from the vehicle transmission. In other applications, the pump might be driven by an electric motor. As is common in this type of hydraulic equipment, there is included a reservoir 90. It is placed in the line between the outlet of knock-off valve 80 and the return to the pump. The pump outlet is connected to the cylinder of the ram with the main control valve 78 being positioned in this line as to control feeding of pressure fluid to the ram. Between the main control valve and the ram cylinder there is a needle valve 92 which permits full flow of pressure fluid to the cylinder but which restricts return flow through an adjustable needle. Thus, the rate at which platform 14 is lowered can be adjusted through manipulation of needle valve 92. Platform 14 is lowered under the influence of gravity and as it drops, it forces the piston into the cylinder of the ram and the pressure fluid is forced from the cylinder through the valve 92 to reservoir 90. By opening needle valve 92, the rate of fall of platform 14 can be increased. In the event of overloading of platform 14, there is included within main control valve 78 a pressure relief valve 78a.

Operation of main control valve 78 is effected through the lever 74. When this lever is pushed upwardly, the lever 70a is pivoted about the pin 94 as to move the upstanding portion of lever 70a, i.e. portion 70b, through an arc towards the main control valve 78 as to push the connecting rod 96 into same. This has the effect of opening the main control valve as to permit pressure fluid to pass therethrough into the cylinder of the ram. If it is desired to hold the platform 14 at any intermediate position, lever 74 is moved to the horizontal position which has the effect of pulling connecting rod 96 from the control valve as to close same so that the return flow of pressure fluid from the cylinder to the reservoir is stopped and the platform is held in the desired position through hydraulic pressure in the ram. Of course, should platform 14 be overloaded at this intermediate position, the pressure relief valve 78a within the main control valve will permit return of pressure fluid to the reservoir and the platform will drop at the rate controlled by the needle valve 92.

In the normal course, lowering of platform 14 is accomplished by pushing handle 74 downwardly which has the effect of pivoting portion 70b of lever 70a away from the main control valve as to pull connecting rod 96 therefrom, which has the effect of opening the main control valve and permitting pressure fluid to drain from the cylinder to the reservoir so as to permit the platform to fall under the influence of gravity.

To lower the platform it is first essential, of course, to release latch 62 from its engagement with the sprocket carriage 44. When the latch is engaged with the carriage the lip 62a rests on top of the lip 64 of the carriage and to permit disengagement of the latch, it is first necessary to move lever 74 to the full "up" position as to fully extend the ram and to then quickly and smoothly move the handle 74 to the "down" position.

The knock-off valve 80 operates, as previously mentioned, when the platform 14 is raised to the top position at which point the stop member 84 contacts the lever 82a. As this occurs, the valve 80 is opened thereby permitting pressure fluid to pass through the valve and back to reservoir 90, i.e. the fluid is diverted from its normal path through the main control valve 78.

As previously mentioned, one of the chief advantages of the loader herein described is that the platform 14 can be raised and lowered while it is in either a vertical or horizontal plane. Thus, the above described lowering and raising operations can be carried out with the platform in a vertical plane equally as well as when it is in a horizontal plane. This means that a vehicle provided with this loader may be backed up tightly against a warehouse platform for direct loading from the warehouse to the vehicle thereby avoiding unnecessary moving of heavy loads over the loader platform.

In the foregoing specification and in the appended claims, reference is made to the "horizontal" position of the platform 14. In this regard, it is to be understood that such expressions as "horizontal" and "parallel to the ground" are used with the assumption that where the lifting apparatus is used on a vehicle, the latter rests on level ground, i.e., the vehicle platform is horizontal or parallel with the ground.

What we claim as our invention is:

1. A hydraulic lifting apparatus for attachment to a raised floor comprising a pair of spaced apart vertical post members fixed to said floor, a pair of slide members carried by and adapted to slide vertically relative to said posts, a platform extending between and pivotally attached to the lower ends of said slide members whereby said platform may be pivoted from a first substantially horizontal position to a second substantially vertical position, and vice versa, a hydraulic ram, flexible linkage means extending from said ram to said slide members whereby actuation of said ram raises and lowers said platform, and means for releasably securing said platform in said second substantially vertical position in such manner that said platform may be secured in said vertical position during raising and lowering of said platform.

2. An apparatus as claimed in claim 1 in which said ram is located between said posts in a substantially horizontal position and includes a sprocket carriage fixed to the outer end of its piston and carrying a pair of sprockets, said flexible linkage means comprising a pair of sprocket chains anchored at one end to a fixed member and at the other end to the lower ends of said slide members, said sprocket chains extending over the sprockets carried by said sprocket carriage and over additional idler sprockets.

3. An apparatus as claimed in claim 2 including automatic lock means for holding said sprocket carriage in its fully extended position whereby to retain said platform in its uppermost position, and further including hand operated means for releasing said automatic lock means when said platform is to be lowered.

4. An apparatus as claimed in claim 1 in which said post members essentially consist of hollow shafts having a slot extending over the full length of one face thereof and in which said slide members consist of rail-like elements adapted to sliding fit within said posts, and including a longitudinally extending flange engaged within said slot with said platform being pivotally attached to the lower ends of said flanges.

5. An apparatus as claimed in claim 1 including a torsion bar, counter-balancing means carried by said platform for exerting a pivoting bias between said platform and the lower ends of said flanges whereby the pivoting of said platform by the operator is assisted through the action of said torsion bar means.

6. An apparatus as claimed in claim 5 in which said trosion bar means comprises a pair of L-shaped torsion bars extending through the pivotal attachment of said platform to said slide members and anchored outwardly thereof to the lower ends of said slide members.

7. An apparatus as claimed in claim 1 including lock means for holding said platform in a vertical plane at its fully raised position, said lock means comprising a latch pivotally attached to one of said slide members and a lug fixed to said platform at a point wherein it is engageable by said latch when the platform is in its vertical and fully raised position, and further including wedge devices fixed to said posts, said wedge devices being so shaped as to urge said platform away from said posts as to ensure continuing engagement of said latch on said lug.

8. An apparatus as claimed in claim 3, further including a knock-off valve operated by a stop member carried by one of said slide members at the lower end thereof, said knock-off valve being adapted to interrupt the flow of pressure fluid to said ram when said platform is brought to its fully raised position.

9. An apparatus as claimed in claim 8, in which the hydraulic circuit operating said ram includes a source of fluid pressure, a reservoir, and a main control valve, and further including a lever mechanism for operating said main control valve manually, said main control valve operating to permit flow of pressure fluid from said source of fluid pressure to said ram while it is in a first position and operating to permit the return flow of pressure fluid from said ram to said reservoir while it is in a second position.

10. An apparatus as claimed in claim 9 in which said hydraulic circuit further includes a needle valve placed between said ram and said main control valve, which needle valve permits full flow of fluid to said ram but which is adjustable with respect to return flow of fluid from said ram to said main control valve whereby the rate of lowering of said platform may be pre-selected through the setting of said needle valve.

11. A hydraulic powered tailgate for a vehicle adapted to act as a loader comprising a pair of spaced hollow post members fixed to the floor of the body of the vehicle in a vertical position, a pair of slide members contained within said posts and including rearwardly extending flanges projecting outwardly of the posts through longitudinal slots in the rear face of the posts, a tailgate pivotally attached to the lower ends of the flanges of said slides and having a pair of torsion bars for counter-balancing the gate as to assist the pivoting of the gate from the horizontal to the vertical; a ram assembly fixed to the floor of the body of the vehicle between said posts and including a cylinder and piston with the closed end of the cylinder being fixed and with the free end of the piston carrying a chain sprocket carriage having a pair of chain sprockets mounted on axles extending generally parallel to the longitudinal axis of the vehicle, a pair of sprocket chains fixed at one end to said ram assembly and fixed at their other ends to the lower ends of said slides, idler sprockets fixed adjacent each of said posts and an additional idler sprocket fixed to said ram assembly, said chains extending between their points of attachment to said ram assembly and said slides over said sprockets whereby actuation of said ram to extend said piston causes said gate to be raised, and a hydraulic circuit for actuating said ram, said circuit including a main control valve, a needle valve, a pressure release valve, a knock-off valve, a reservoir and pump means, and a first conduit leading from said pump means to said main control valve and subsequently to said cylinder, said needle valve and pressure release valve being contained in said first conduit, a second conduit leading from said first conduit to said knock-off valve and a third conduit leading from said knock-off valve to said reservoir, said knock-off valve being automatically operative as said gate is raised to its uppermost position to divert pressure fluid from said first conduit to said reservoir as to prevent feeding of further pressure fluid to said cylinder, manually operable mechanical linkages connected to said main control valve for operation thereof, and a safety catch adapted to engage said sprocket carriage when said pistion has been fully extended and said gate raised to its uppermost position, said mechanical linkages also being adapted to release said safety lock when said gate is to be lowered.

12. An apparatus as claimed in claim 1 in which said releasable securing means for said platform consists of a first latch member carried by each of said slide members, and said latch members carried on each side edge of said platform.

13. An apparatus as claimed in claim 4 in which said releasable securing means for said platform consists of a first latch member carried by each of said flanges and second latch members carried on each side edge of said platform.

14. A hydraulic lifting apparatus for attachment to a raised floor comprising a pair of spaced apart vertical post members fixed to said floor, a pair of slide members carried by and adapted to slide vertically relative to said posts, a platform extending between and pivotally attached to the lower ends of said slide members whereby said platform may be pivoted from a first substantially horizontal position to a second substantially vertical position, and vice versa, a hydraulic ram, flexible linkage means extending from said ram to said slide members whereby actuation of said ram raises and lowers said platform, said ram being located between said posts in a substantially horizontal position and including a sprocket carriage fixed to the outer end of its piston and carrying a pair of sprockets, said flexible linkage means consisting of a pair of sprocket chains anchored at one end to a fixed member and at the other end to the lower ends of said slide members, said sprocket chains extending over the sprockets carried by said sprocket carriage and over additional idler sprockets, automatic lock means for holding said sprocket carriage in its fully extended position whereby to retain said platform in its uppermost position, and further including hand operated means for releasing said automatic lock means when said platform is to be lowered.

15. An apparatus as claimed in claim 14, further including a knock-off valve operated by a stop member carried by one of said slide members at the lower end thereof, said knock-off valve being adapted to interrupt the flow of pressure fluid to said ram when said platform is brought to its fully raised position.

16. An apparatus as claimed in claim 15, in which the hydraulic circuit operating said ram includes a source of fluid pressure, a reservoir, and a main control valve, and further including a lever mechanism for operating said main control valve manually, said main control valve operating to permit flow of pressure fluid from said source of fluid pressure to said ram while it is in a first position and operating to permit the return flow of pressure fluid from said ram to said reservoir while it is in a second position.

17. An apparatus as claimed in claim 16 in which said hydraulic circuit further includes a needle valve placed between said ram and said main control valve, which needle valve permits full flow of fluid to said ram but which is adjustable with respect to return flow of fluid from said ram to said main control valve whereby the rate of lowering of said platform may be pre-selected through the setting of said needle valve.

18. A hydraulic lifting apparatus for attachment to a raised floor comprising a pair of spaced apart vertical post members fixed to said floor, a pair of slide members carried by and adapted to slide vertically relative to said posts, a platform extending between and pivotally attached to the lower ends of said slide members whereby said platform may be pivoted from a first substantially horizontal position to a second substantially vertical position, and vice versa, a hydraulic ram, flexible linkage means extending from said ram to said slide members whereby actuation of said ram raises and lowers said platform, lock means for holding said platform in a vertical plane at its fully raised position, said lock means consisting of a latch pivotally attached to one of said slide members and a lug fixed to said platform at a point wherein it is engageable by said latch when the platform is in its vertical and fully raised position, and further including wedge devices fixed to said posts, said wedge devices being so shaped as to urge said platform away from said posts as to ensure continuing engagement of said latch on said lug.

References Cited by the Examiner

UNITED STATES PATENTS

| | | | |
|---|---|---|---|
| 2,706,565 | 4/1955 | Krasno | 214—75 |
| 2,984,517 | 5/1961 | Farrow et al. | 296—57 |
| 3,011,664 | 12/1961 | Novotney | 214—75 |
| 3,174,634 | 3/1965 | Peck | 214—75 |

GERALD M. FORLENZA, *Primary Examiner.*

R. G. SHERIDAN, *Assistant Examiner.*